April 22, 1924.
L. R. RANSDALL
1,491,246
AUTOMOBILE TURNTABLE
Filed May 19, 1923
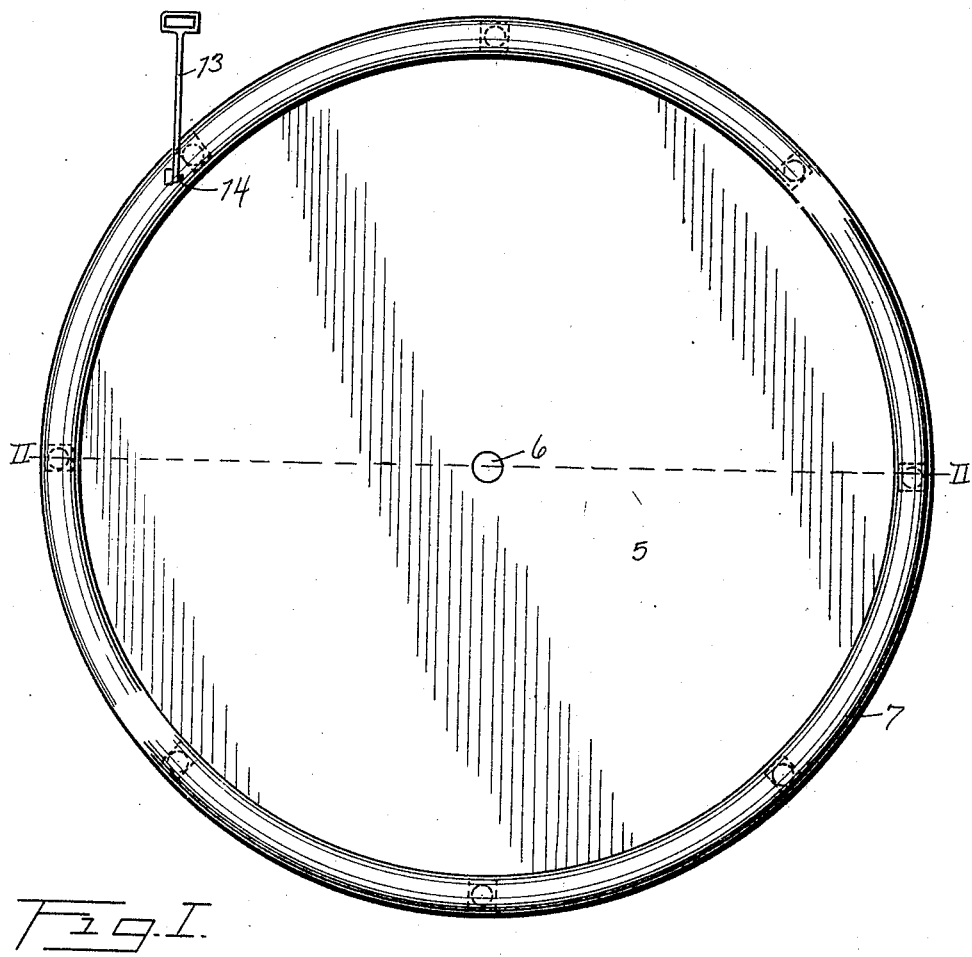
Fig. I.
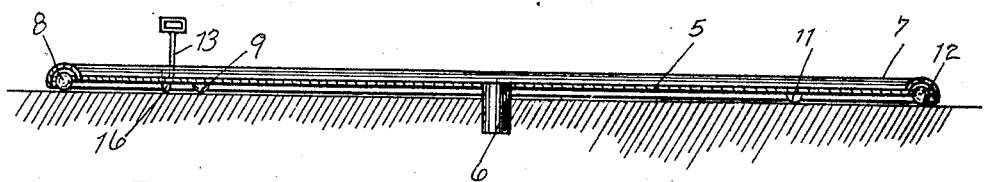
Fig. II.
INVENTOR.
LENA R. RANSDALL
BY *Victor J. Evans*
ATTORNEYS.

Patented Apr. 22, 1924.

1,491,246

UNITED STATES PATENT OFFICE.

LENA R. RANSDALL, OF SAN FRANCISCO, CALIFORNIA.

AUTOMOBILE TURNTABLE.

Application filed May 19, 1923. Serial No. 640,152.

*To all whom it may concern:*

Be it known that I, LENA R. RANSDALL, a citizen of the United States, residing at San Francisco, in the county of San Francisco and State of California, have invented new and useful Improvements in Automobile Turntables, of which the following is a specification.

This invention relates to improvements in turntables and has particular reference to a turntable for the use of automobiles.

The principal object of this invention is to provide a simple means whereby an automobile may be turned about in a garage, thus saving the necessity of maneuvering as is now usually necessary which maneuvering necessitates a large waste of space.

Another object is to produce a turntable which is cheap to manufacture and simple to install.

A still further object is to provide simple means for locking the turntable against rotation, when desired.

Other objects and advantages will be apparent during the course of the following description.

In the accompanying drawings forming a part of this specification, and in which like numerals are employed to designate like parts throughout the same, Figure 1, is a top plan view of my device, Figure 2, is a cross section taken on the line 2—2 of Figure 1.

Applicant is aware of the fact that turntables have been employed for the purpose of moving an object. These turntables, however, have been cumbersome, complicated and expensive to install, with the result that few people could afford to have them.

I have therefore sought to overcome this difficulty by providing a turntable which may be placed upon the floor of a garage, which turntable consists of a flat disc with an upstanding rim having roller bearings thereon.

In the accompanying drawings wherein for the purpose of illustration is shown a preferred embodiment of my invention, the numeral 5 designates a flat metal disc secured to a pivot 6. This pivot merely serves to position the turntable upon the floor, and to prevent lateral movement thereof.

At 7, I have shown an upwardly pressed rim, substantially semi-circular in cross section. This rim provides for the accommodation of roller bearings as indicated at 8, 9, 11 and 12.

It is of course obvious that as many balls can be placed within the rim as is desired.

At 13, I have shown an operating lever pivoted at 14 to the rim 7 and having connected thereto a downwardly extending locking pin 16.

The operation of my device is as follows:—

Assuming that the parts are in position as shown in Figure 2 a vehicle may be moved thereon by passing over the rim 7, onto the disc 5. After the machine is upon the disc, the handle of the lever 13 is grasped and raised. This moves the locking pin 16 out of contact with the floor of the garage, after which the device as a whole may be rotated about its pivot 6 until the desired turn has taken place, after which the natural weight of the lever 13, when released, forces the pin 16 into contact with the garage floor again, thus preventing further rotation.

It will thus be seen that I have provided a very simple and efficient turntable, one which may be cheaply manufactured and sold at a price well within the purchasing ability of the average car owner.

It is to be understood that the form of my invention, herewith shown and described is to be taken as a preferred example of the same, and that various changes in the shape, size and arrangement of parts may be resorted to without departing from the spirit of the invention, or the scope of the subjoined claim.

Having thus described my invention, I claim:—

A device of the character described comprising a disc, an upstanding rim formed on the periphery of said disc, said rim being substantially semi-circular in cross section and having one edge thereof lying in a plane below the plane of the other edge of said rim, a pivot secured to the center of said disc and adapted to enter a support, rollers interposed between said rim and the support, means for locking said disc to the support, said means comprising a lever pivoted to said rim and having a portion thereof engaging the support for the purpose specified.

In testimony whereof I affix my signature.

LENA R. RANSDALL.